(12) United States Patent
Freese

(10) Patent No.: US 10,180,931 B2
(45) Date of Patent: Jan. 15, 2019

(54) USING A TEMPLATE PROCESSOR TO DETERMINE CONTEXT NODES

(75) Inventor: Agnes Freese, Niwot, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 948 days.

(21) Appl. No.: 13/368,300

(22) Filed: Feb. 7, 2012

(65) Prior Publication Data

US 2013/0080876 A1    Mar. 28, 2013

Related U.S. Application Data

(60) Provisional application No. 61/540,187, filed on Sep. 28, 2011.

(51) Int. Cl.
*G06F 17/22*    (2006.01)

(52) U.S. Cl.
CPC ................. *G06F 17/227* (2013.01)

(58) Field of Classification Search
CPC .................................................... G06F 17/227
USPC ........................................................ 715/234
See application file for complete search history.

(56) References Cited

U.S. PATENT DOCUMENTS

| | | | |
|---|---|---|---|
| 6,823,495 B1 | 11/2004 | Vedula et al. | |
| 7,096,422 B2 | 8/2006 | Rothschiller et al. | |
| 7,237,207 B2 | 6/2007 | Panditharadhya et al. | |
| 7,636,894 B2 | 12/2009 | Vedula et al. | |
| 7,676,756 B2 | 3/2010 | Vedula et al. | |
| 8,280,923 B2 | 10/2012 | Robertson et al. | |
| 2003/0120686 A1* | 6/2003 | Kim | G06F 17/218 |
| 2003/0237046 A1 | 12/2003 | Parker et al. | |
| 2004/0172616 A1 | 9/2004 | Rothschiller et al. | |
| 2005/0015732 A1 | 1/2005 | Vedula et al. | |
| 2005/0021513 A1 | 1/2005 | Vedula et al. | |
| 2005/0132282 A1 | 6/2005 | Panditharadhya et al. | |
| 2005/0257193 A1 | 11/2005 | Falk et al. | |
| 2009/0125512 A1 | 5/2009 | Robertson et al. | |

(Continued)

OTHER PUBLICATIONS

Villard et al., "An Incremental XSLT Transformation Process for XML Document Manipulation," 2002 available: http://www.research.ibm.com/people/v/villard/Papiers/incxslt/incXSLT.html.*

(Continued)

*Primary Examiner* — Shawn S Joseph
(74) *Attorney, Agent, or Firm* — Kilpatrick Townsend & Stockton LLP

(57) ABSTRACT

Embodiments of the current invention may include methods, systems, and products designed to utilize a template processor to determine particular data types and/or data instances that are matched to each of a number of different templates. An input file containing at least a data type/instances portion may be processed along with another input that includes templates with code for processing one or more of the data types/instances. Some of the data types/instances may have a unique identifier added to the definition and/or instantiation. Similarly, some of the templates may have code added that may cause the template processor to create an output for each data type/instance that is processed using the template. The output of the processor may then be used to indicate which of the data types/instances may be processed by each template for which the additional code was added.

23 Claims, 17 Drawing Sheets

(56) References Cited

U.S. PATENT DOCUMENTS

2013/0097487 A1    4/2013   Alli et al.
2014/0149961 A1    5/2014   Falk et al.

OTHER PUBLICATIONS

DuCharme, "Generating Unique IDs and Linking to Them," 2001 available: http://www.xml.com/pub/a/2001/1.*
Altova, XMLSpy Professional Edition User Manual, 2006, available at http://www.fme.aegean.gr/sites/default/files/xmlspypro_manual.pdf (Year: 2006).*
U.S. Appl. No. 13/693,942, filed Sep. 30, 2013, No Office Action as of Sep. 30, 2013.
Non-Final Office Action dated Jul. 6, 2015 for U.S. Appl. No. 13/693,942, 14 pages.
Notice of Allowance dated Feb. 29, 2016, U.S. Appl. No. 13/693,942, 8 pages.

* cited by examiner

FIG. 4C

USING A TEMPLATE PROCESSOR TO DETERMINE CONTEXT NODES

CROSS-REFERENCES

This application is a nonprovisional of, and claims benefit to Provisional Application No. 61/540,187, filed Sep. 28, 2011, and entitled "USING XSLT PROCESSOR TO DETERMINE CONTEXT NODES FOR DESIGN-TIME DISPLAY," the entire contents of which are herein incorporated by reference for all purposes.

BACKGROUND

In some software applications, instances of a particular data type may be processed, formatted, and/or displayed according to one or more style sheets. A style sheet may by written in a number of different formats and programming languages, and may include templates that include instructions for operations performed on one or more of the instances of the data types according to matching criteria. A template processor may analyze an input file including data type definitions and instances. The template processor may also analyze an input file that includes template definitions, which may include matching criteria and processing instructions. Data types and/or instances may be matched by the template processor to template definitions according to the matching criteria, and output may be produced according to instructions within the template definitions.

For example, XML files may contain elements and sub-elements that may be considered data types and/or data instances. An XSLT file is a type of style sheet that contains templates used by an XSLT processor to process the XML data types and instances. The XSLT templates may be denoted by the <xsl:template> instruction, which includes a "match" attribute. The "match" attribute may be used by the XSLT processor to match a characteristic of one or more of the XML data types/instances to the template by comparing the match field to the attributes and/or sub-elements of the data type/instance.

BRIEF SUMMARY

In one embodiment, a method of matching templates with data instances may be presented. The method may comprise receiving a first input comprised of a first data instance; adding a unique identifier to the first data instance; receiving a second input comprised of a first template; and adding output instructions to the first template. The first template may be comprised of instructions for processing the first data instance, and the output instructions may be configured to instruct a template processor to provide an output. The output may comprise identifying information for the first template, and the unique identifier of the first data instance. The method may further include processing the first input and the second input with the template processor, where the template processor may be configured to process data instances according to instructions within a template definition.

In another embodiment, a system for determining context nodes for design-time display may be presented. The system may comprise an XSLT processor, and a storage device having sets of instructions stored thereon. The sets of instructions may cause the system to receive an XML input comprised of a first XML element; add a unique identifier as an attribute to the first XML element; receive an XSLT input comprised of a first template; and add output code to the first template. The first template may be comprised of code for processing the first XML element, and the first template may be comprised of an expression that matches the first template with the first XML element. The output code may be configured to instruct the XSLT processor to provide an output, where the output may be comprised of identifying information for the first template and the unique identifier of the first XML element. The sets of instructions may further cause the system to process the XML input and the XSLT input with the XSLT processor.

In yet another embodiment, a computer-readable medium for using an XSLT processor to determine context nodes for design-time display medium may be presented. The computer-readable medium may have sets of instructions stored thereon, which when executed by a computer system, cause the computer system to receive an XML input comprised of a first XML element; add a unique identifier as an attribute to the first XML element; receive an XSLT input comprised of a first template; and add output code to the first template. The first template may be comprised of code for processing the first XML element, and the first template may be comprised of an expression that matches the first template with the first XML element. The output code may be configured to instruct the XSLT processor to provide an output comprised of identifying information for the first template and the unique identifier of the first XML element. The sets of instructions may further cause the computer system to process the XML input and the XSLT input with the XSLT processor.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 4C illustrates a block diagram for generating an XSLT input, according to one embodiment.

DETAILED DESCRIPTION

Figure 1:
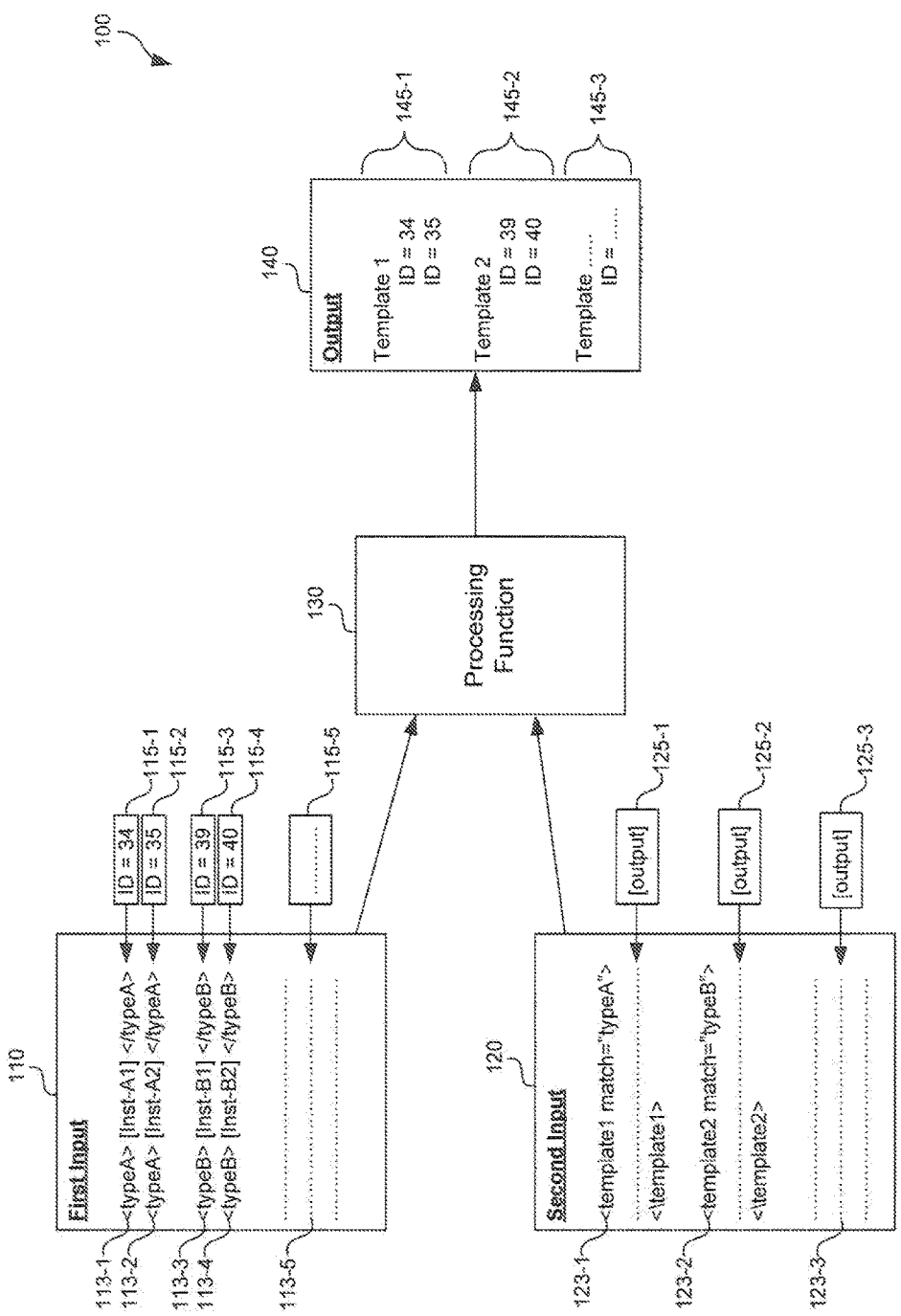
FIG. 1 illustrates a diagram for determining context nodes according to one embodiment.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flow chart, a flow diagram, a data flow diagram, a structure diagram, or a block diagram. Although a flow chart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the current invention may include methods, systems, and products designed to utilize a template processor to determine particular data types and/or data instances that are matched to each of a number of different templates. An input file containing at least the data type portions of an input file may be processed along with another input that includes templates with code for processing one or more of the data types/instances. Some of the data types may have a unique identifier added to the definition and/or instantiation. Similarly, some of the templates may have code added that may cause the template processor to create an output for each data type/instance that is processed using the template. The output of the processor may then be used to indicate which of the data types/instances may be processed by each template for which the additional code was added.

In a particular embodiment, a first input file may be comprised of XML elements and sub-elements, and a second input file may be comprised of an XSLT style sheet definition. An "ID" tag may be added to certain elements in the XML, and the <xsl:template> definitions may have code added to output the "ID" of each context node that is processed by the template. In order to determine which nodes are processed by each template, the modified XML and XSLT files may be run through an XSLT processor to generate an output file that specifically calls out these associations.

Prior to this disclosure, there is no implementation which allows a user to reliably determine context nodes for matched templates during design time editing of XSLT. For example, a matched template is an <xsl:template match="expression"> instruction that defines a match pattern that the XSLT processor may use to determine which input XML nodes will be processed by instructions within that template. Even though XSLT allows for the definition of matched templates, i.e. templates that are matched to nodes based on a matching criteria, it is difficult to determine at design time which nodes will meet the matching criteria and which will actually be processed by the template. Because the <xsl:apply-templates> instruction may include relative and absolute XPath references, a user cannot simply match nodes with templates using the match expression alone. For example, one could not simply match the text of the match expression with the names of XML elements. Instead, the entire structure of the XML and XSLT documents must be analyzed.

A "template processor" is a processing function that may be configured to process an input containing data types/instances in accordance with a second input that includes template definitions that may be matched to the data types/ instances according to a matching criteria. In one embodiment, a template processor may be used to format the data input using the instructions in each template. Many different types of programming languages may utilize a template processor, with each language having its own rules for defining templates and data types, along with rules for processing a template-based hierarchy. The template processor may be implemented by any combination of hardware and/or software, such as the various components of computer system 900 described in FIG. 9 hereinbelow.

XML is but one example of a language that may be used to implement certain embodiments. However, it should be understood in light of this disclosure that the examples illustrating the use of XML and XSLT are merely exemplary, and not meant to be limiting. For example, any other language using templates could be used, such as C++, C#, CSS, java, Pearl, and/or the like.

For embodiments that use XML/XSLT, the template processor may be implemented by an XSLT processor. An XSLT processor is a processing function that may be configured to process an XML input in accordance with an XSLT style sheet. The XSLT processor has the ability to parse and use match expressions to determine which expression best matches any given input node. It also handles the issue of import precedence when an XSLT style sheet imports other/style sheets. Generally, an XSLT processor creates an output file of the input XML that has been formatted into an HTML document, or another XML document. An input node that is processed by a matched template is referred to as a "context node."

Currently, the problem exists in design time of determining the context node for a given template. This information is important at design time in order to automatically generate XPath expressions relative to the context node and to provide an indication to a designer that can indicate the correct context nodes when the user enters a relative XPath expression. The information can also be used to highlight a context area and find errors in the overall structure of the XSLT before the user deploys the XSLT to an application server.

Although it is difficult for a user to match nodes to templates during design time, the XSLT processor is designed to perform this task, albeit only when the code is fully processed. Prior solutions do not take advantage of the XSLT processor to determine the context nodes for a template because of the processing overhead involved with processing the entire contents of the XML and XSLT files. This is somewhat similar to compiling source code for a large project—it is not an efficient use of the compiler to continuously recompile code to provide feedback to a user during design time. Furthermore, an XSLT processor is only designed to generate formatted output; it is not designed to map templates to context nodes. Simply running an XML file and an XSLT file through an XSLT processor would not produce a useful output in this regard.

Embodiments described herein may be configured to use the XSLT processor to generate an output that maps templates to context nodes. In some embodiments, the input files may have code added to the data type definitions and/or instantiations to uniquely identify them when they are used as context nodes. Additionally, the template definitions may have code added that instructs the XSLT processor to output a mapping, or indication, of context nodes for one or more of the templates.

Because aspects of the present invention reuse the XSLT processor itself to determine context nodes, this insures that a user will get the same results upon deployment to an application server that they see during design time. Some embodiments may use the XSLT processor within a design-time editor to determine context nodes and provide real-time feedback to a designer. These embodiments may create another XSLT style sheet that is based on the user's XSLT style sheet that may provided output for each context node that is matched template in the XSLT as it is being edited. This represents a large improvement over existing editors.

FIG. 1 illustrates a diagram 100 for determining context nodes according to one embodiment. First input 110 may contain one or more data instances 113. The data instances 113 may be of one or more different data types. For example, data instance 113-1 and data instance 113-2 may be of data type "A". Data instance 113-3 and data instance 113-4 may be of data type "B". The data types in the first input 110 may be hierarchical, such that one data type inherits attributes of another data type. Furthermore, data types may be hierarchical in an organizational sense, such that data type "B" may have a definition that falls under type "A" and a definition that does not fall under type "A".

A second input 120 may be provided and may be comprised of one or more templates 123. Each template 123 may contain a matching expression. The matching expression may be used by a processing function 130 to match the templates 123 in the second input 122 with the data types or data instances 113 in the first input 110. This matching operation may be carried out strictly such that only exact matches may be made. Alternatively, the matching operation we carried out loosely, where matches may be made which adhere to a "closest fit" protocol.

Before the first input 110 is passed to the processing function 130, unique identifiers 115 may be added to each data type definition and/or each data instance 113. If the processing function matches templates to data types, then unique identifiers 115 may be added to each data type definition. On the other hand, if the processing function 130 matches templates to data instances 113, then unique identifiers 115 may be added to each data instance 113. For example, in FIG. 1 unique identifier 115-1 is added to data instance 113-1 of data type "A". Similarly, unique identifier 115-2 may be added to data instance 113-2 of date type "A".

Unique identifiers 115 may be chosen such that their name is not likely to be used in any of the existing type definitions of data instances 113. Although FIG. 1 illustrates unique identifiers 115 with the name "ID", this is a name that may be used by other fields in the data types. Therefore, in other embodiments, unique identifiers 115 may use more complicated names, and/or may use alphanumeric strings that may be generated from a hash function or a similar type of function configured to generate a unique string.

Before the second input 120 is passed to the processing function 130, output instructions 125 may be added to one or more of the templates 123. Output instructions 125 may be comprised of instructions that cause the processing function 132 to output an indication of each context node (data types/instances) as it is processed by the templates 123. For example, output instructions 125 could be comprised of instructions that cause the processing function 130 to print a text output to an output file that describes the relationship between the context nodes and templates 123.

The processing function 130 may accept both the first input 110 and the second input 120 and process these two files as it would any other combination of inputs. Because the first input 110 and the second input 120 may have been modified to include unique identifiers 115 and output instructions 125, the processing function may, in addition to generating its regular output, also generate an output 140 that describes any relationships 145 between templates and context nodes. For example, in FIG. 1 output 140 contains a text listing for each template processed describing the discovered relationships 145. The "Template 1" relationship 145-1 includes a text listing for IDs 34 and 35. This indicates that data instance 113-1 and data instance 113-2 were both matched to template 123-1 and processed by the processing function 130. Similarly, the "Template 2" relationship 145-2 includes a text listing for IDs 39 and 40. This indicates that data instance 113-3 and data instance 113-4 were both matched to template 123-2 and processed by the processing function 130.

The output 140 may be in any format that is machine-readable or human readable. Furthermore, the output 140 relating templates and context nodes may be a separate file from the regular output of the processing function 130, or the output 140 may be combined with the regular output in a single file. Similarly, first input 110 and second input 120 may be in the same file or in different files. Both inputs may be generated by a user, or one or more may be generated by another processing function. Both inputs may be supplied to the processing function 130 automatically, in response to an event, or in response to an output to the user requesting said inputs. For example, the computer system may output a request to a user to supply the first input 110 and/or the second input 120. On the other hand, the first input 110 and/or the second input 120 may be generated automatically from existing data retrieved from a database, extracted from a memory, downloaded from the website, and/or the like. The first input 110 and/or the second input 120 may be in the form of an input data stream, or in stored in an input file.

In one embodiment, first input 110 may be comprised of an XML file containing XML elements and sub-elements. Unique identifiers 115 may be added to the XML elements as attributes. Similarly, second input 120 may be comprised of an XSLT style sheet. The XSLT style sheets may include template definitions with "match" attributes that may be compared to elements in the XML. Processing function 130 may be an XSLT processor. Output 140 may be in the form of an XML document, PDF document, an HTML document, or any other document type that may be created by an XSLT style sheet.

Figure 2:
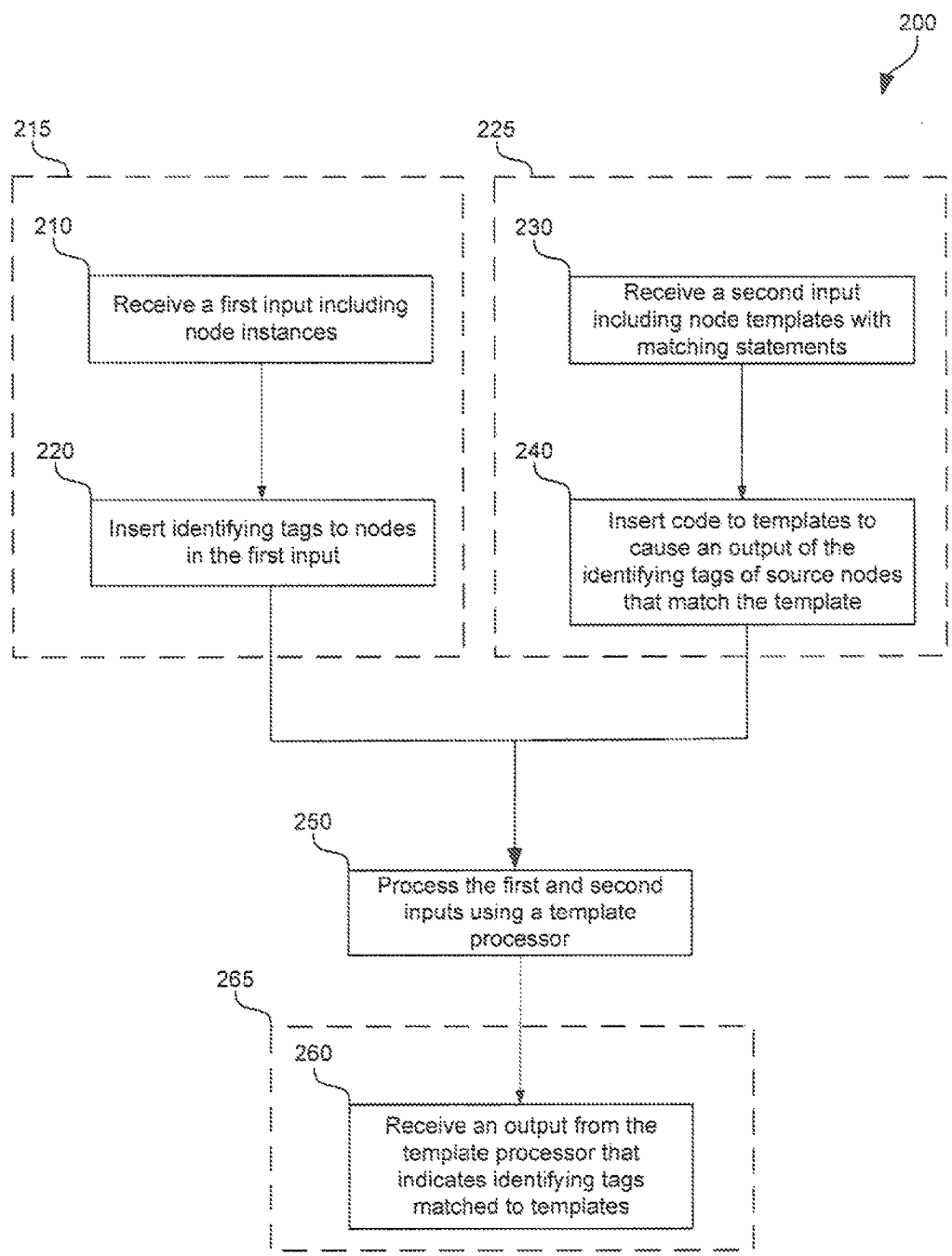
FIG. 2 illustrates a flow chart of a method for determining context nodes, according to one embodiment.

FIG. 2 illustrates a flow chart 200 of a method for determining context nodes, according to one embodiment. At step 210, a first input may be received that includes node instances. The node instances may be data type definitions and/or data instances. The input may be received by any of the input devices 910 discussed below in FIG. 9. Additionally, the first input may be received in response to an output requesting the input, or may be generated automatically and/or provided in response to an event.

Step 220, identifying tags may be inserted to one or more nodes in the first input. The identifying tags may be unique identifiers that may be inserted directly into the code of the node. The unique identifiers may be coded in the form of a variable definition, as an attribute to a data type, and/or the like. Step 210 and step 220 together comprise group 215 in the flow chart 200 and may be referred to as the first input processing steps.

At step 230, a second input may be received. The second input may include templates for one or more of the nodes in the first input file, and the nodes may have matching statements to determine which nodes in the first input should be processed by the node templates in the second input. Like the first input, the second input may be received in response to an output requesting the input, or may be generated automatically, and/or provided in response to an event. The second input may be in the form of a data stream, stored in an input file, and/or the like.

At step 240, code may be inserted into the node templates to cause the processing function to generate an output that links the identifying tags from the first input with the templates of the second input. Step 230 and step 240 together may comprise group 225 in the flow chart 200 and may be referred to as the second input processing steps. The code added to the templates in the second input may be generated automatically by a computer system in response to an event, or may be generated manually by a user, and may be in response to an output requesting such. For example, if the user is generating files in a code editor, the editor may automatically generate both the first input and the second input in the background of the editor without interrupting the user. Alternatively, the user may supply and/or edit both files prior to processing.

At step 250, the first input and the second input may be processed using a processing function. The processing function may comprise a template processor configured to match the input nodes in the first input with the templates of the second input, and to execute the code within the templates to format or otherwise process the nodes of the first input. The template processor may additionally process the code inserted into the templates, causing an output identifying each context node as it is processed by the template. For example, if the first input includes a first data type, and the second input includes a first template, the processing function may then output the unique identifier of each data instance of the first data type that is matched to the first template.

At step 260, the output of the template processor may be received. In addition to a regular output generated by the existing template code, the output may also include mappings between templates and nodes. For example, if the output of the template processor is an HTML file, the mappings between templates and nodes could be encapsulated in special HTML tags or comments. These additional outputs could be configured such that they do not interfere with processing the regular HTML file. In another embodiment, the output may be an XML file, and the mappings between templates and nodes may comprise elements in the XML. In yet another embodiment, the mappings between templates and nodes may be in the form of a textual output separate from the regular output. Group 265 may comprise step 260 in the flow chart 200 and may be referred to as the output processing steps.

Figure 3A:
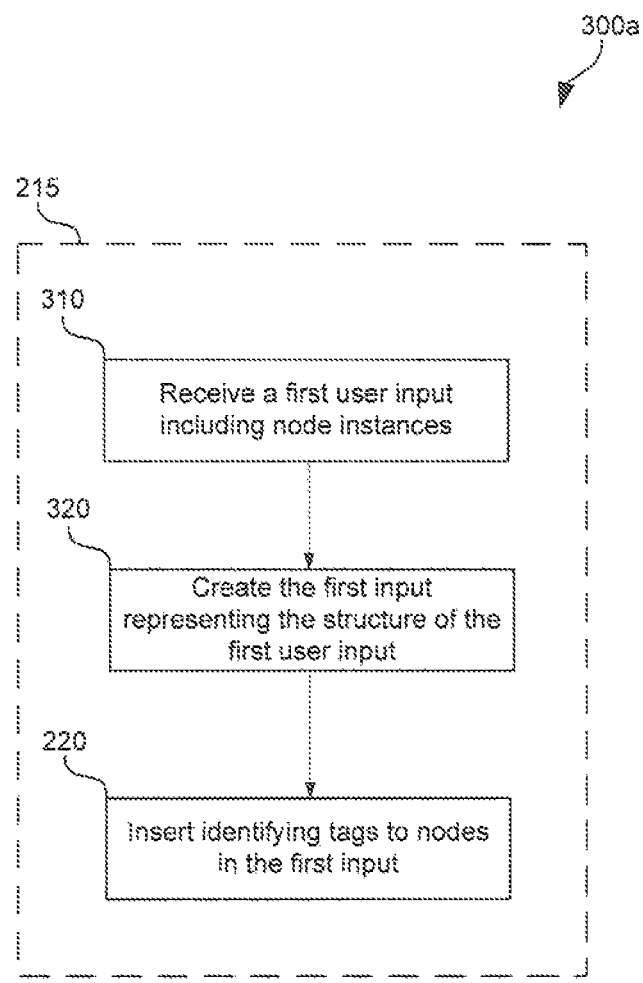
FIG. 3A illustrates a flow chart of a method of generating a first input, according to one embodiment.

In one embodiment, additional steps may be added to the input processing group 215. FIG. 3A illustrates a flow chart 300*a* of a method of generating a first input, according to one embodiment. Here, additional steps may be added to flow chart 200 such that the first input may be derived from a first user input. At step 310, the first user input may be received, and the first user input may include node instances and/or definitions. After receiving the first user input, the first input may be derived by removing information from the first user input that is not related to the data structure of the document. One embodiment may only be concerned with certain data types, and thus the first input may be created from the first user input by removing all information from the first user input that does not involve these data types.

Accordingly, at step 320 the first input may be created such that it represents the structure of the first user input. In other words the information not related to the data type structures and organization may be removed. The process for generating the first user input may be implemented by constructing a temporary tree internally that replicates the first user input. Many different methods may be used to represent the structure and of organization of the first user input when generating the first input.

In step 220, unique identifiers may be inserted as identifying tags to nodes in the first input. In one embodiment, the first input may be a separate file from the first user input and may be represented internally by a computer system without being visible to the user. The unique identifiers may be added to this internal file such that the first user input is not altered by the method in flow chart 300*a*. By creating a separate file, the size of the first input may be reduced. This may be important because it may reduce the processing time required to generate the node/template mappings. As generating these mappings may be done in the background of a source code editor, it may be beneficial to minimize processing time and resources required by these background processes.

Figure 3B:
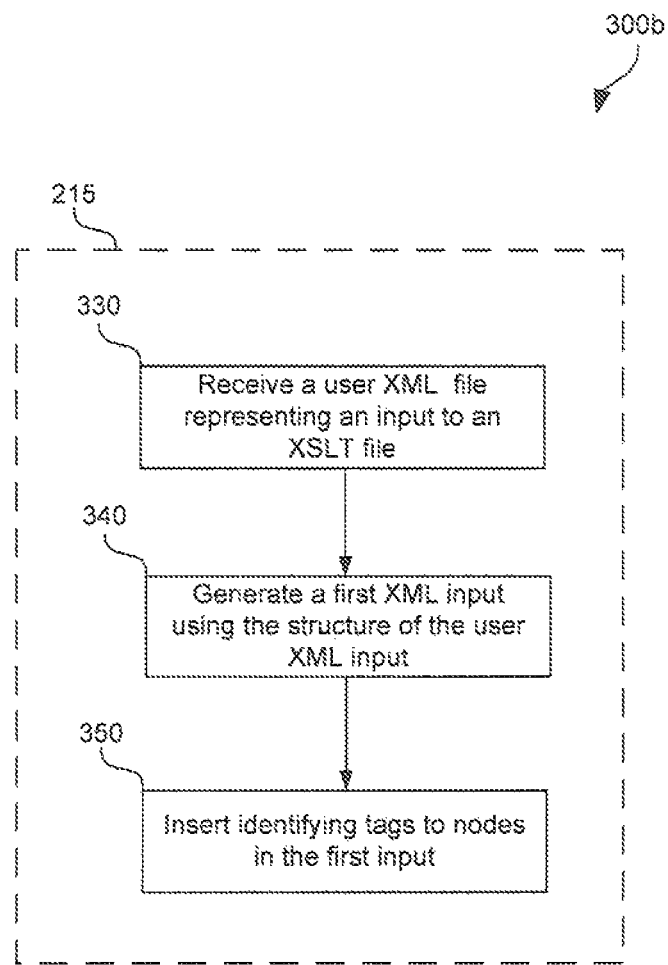
FIG. 3B illustrates a flow chart of a method for generating a first input using XML.

In one embodiment, the method may be implemented using XML files. FIG. 3B illustrates a flow chart 300*b* of a method for generating a first input using XML. The input processing steps in group 215 may include additional steps designed to process user XML files to generate the first input. At step 330, a user XML file may be received representing the XML input to an XSLT style sheet file. The user XML file may be generated by a user in a source editor in a computer system, may be generated by an automated process, or may be retrieved from a memory location. The source editor may also generate an output requesting that the user select an XML file from a project comprised of multiple source files. In one embodiment, the user XML file may be a schema document that defines the structure of another XML document. The structure defined by the schema document may be used to generate the first XML input described below.

At step 340, the method may generate a first XML input by extracting the structure of the user XML input. The structure of the user XML input may be used to generate a complete XML input in a separate file. At step 350, identifying tags may be inserted as attributes to one or more elements in the first XML input. For example, if only certain elements in the user XML are selected to be matched to templates, then non-selected elements and non-selected sub-elements may be removed, leaving only the element definitions in the first XML input. The first XML input may be represented internally by a Document Object Model (DOM) tree.

Figure 3C:
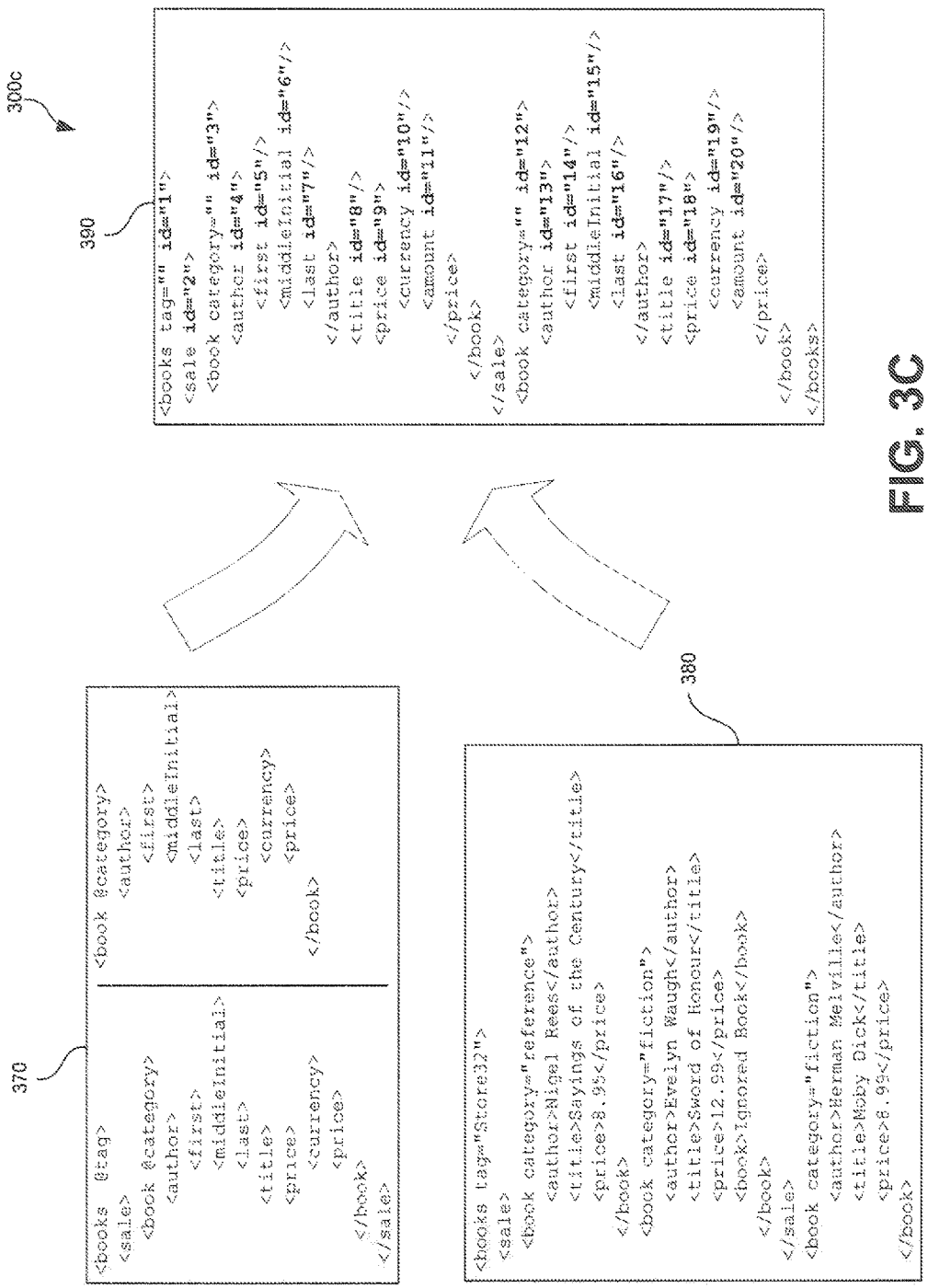
FIG. 3C illustrates a block diagram for generating a first XML input, according to one embodiment.

FIG. 3C illustrates a block diagram 300*c* for generating a first XML input, according to one embodiment. File 370 represents an XML structure file generated from a schema definition for an inventory of books. File 380 may represent an XML instantiation of the schema of file 370 where specific values have been assigned to various attributes and elements. File 390 may represent the first XML input derived from either the XML structure file 370, or the XML file 380. If XML file 380 is used, the structure of file 380 may be extracted and checked to ensure that the structure is complete, i.e. that no elements from the schema are missing. Missing elements from the schema may be added. Furthermore, in one embodiment, the structure file 370 may be generated from the XML file 380. In this example, each element in file 390 is given a unique identifier designated by the "id" attribute. This attribute may be added to each element and assigned unique number. In other examples, a more complex attribute name may be used such that it is unlikely to be duplicated by any existing attribute. File 390 may be represented internally by a computer system and may or may not be viewable and/or editable by the user. Furthermore, the file 390 may be generated automatically as a background process, and user settings may be available such that the automatic generation of file 390 may be controlled, modified, and/or prevented.

Figure 4A:
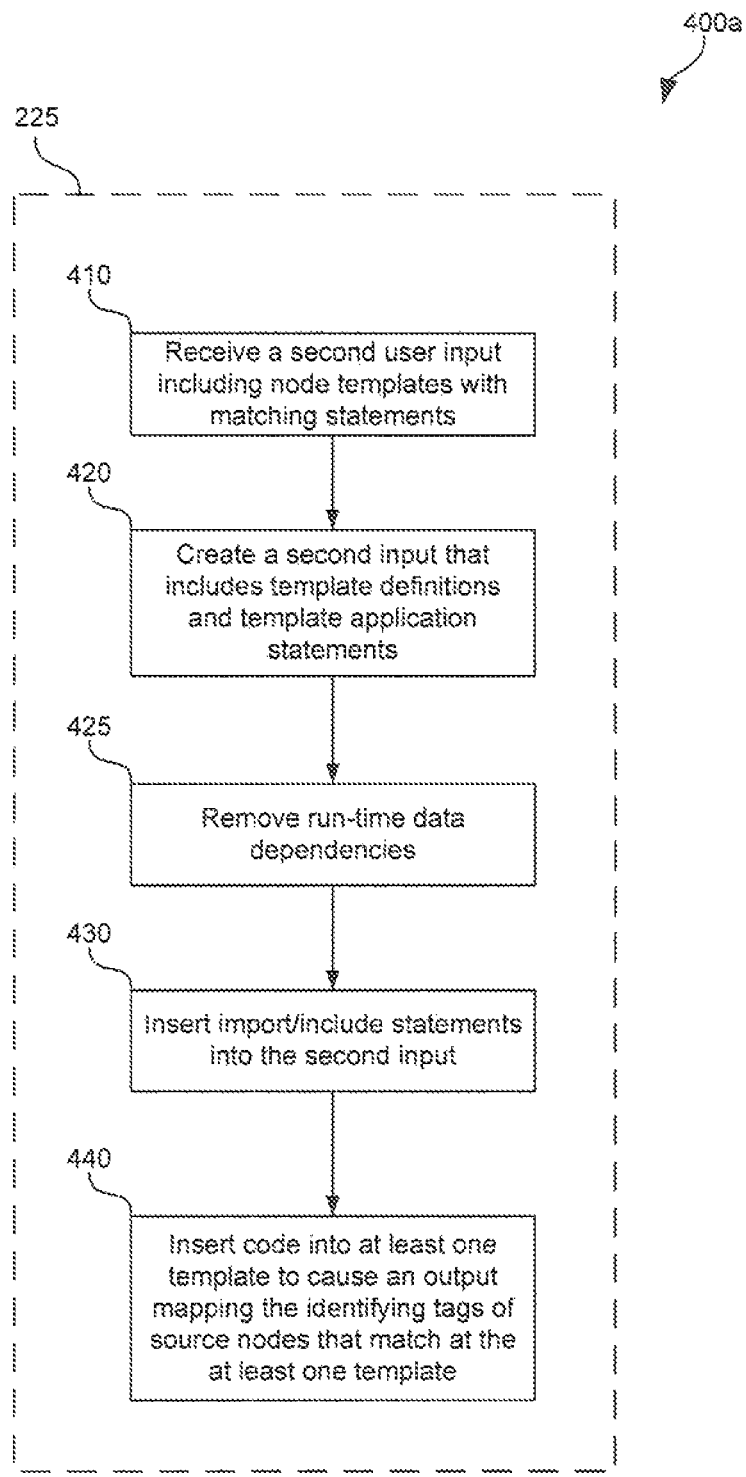
FIG. 4A illustrates a flow chart of a method for generating a second input, according to one embodiment.

As with the first input processing steps in group 215, the second input processing steps in group 225 may also be expanded. FIG. 4A illustrates a flow chart 400*a* of a method for generating a second input, according to one embodiment. At step 410, additional steps may be added such that a second user input may be received. The second user input may include template definitions and matching expressions. As with the first user input, second user input may be generated automatically or received in response to an output requesting such. Also, the second input may be generated and/or edited by/in a source editor.

At step 420, the second input may be derived from the second user input such that the second input includes the template definitions and any statements directing a processing function to apply additional templates. For example, some template definitions may include recursive calls to execute portions of the template code on sub-elements of the context node, or may include calls to execute other templates. At step 425, any run-time data dependencies may be removed from the template definitions. A run-time data dependency may be a part of the code used to match a template to a data instance/definition, where the matching depends upon the specific values of at least one field and/or attribute within the data instance/definition. Because these specific values may be removed from the first input, they might not be available to the templates for matching within the template processor. In embodiments where this is the case, the run-time data dependencies may be removed from the template definitions.

At step 430, template definitions may be inserted into the second input according to import/include statements in the second user input. For example, the second user input may contain instructions to execute template definitions found in other files and/or memory locations. The code from these files may be referenced by one or more import/include statements, and may be included in the second input. These external templates may be written directly into the second input, or they may simply be referenced. At step 440, code may be inserted into one or more of the templates in the second input. The code may be configured to cause the template processor to generate an output which maps the unique identifiers in the first input process to one or more or the templates in the second input.

Figure 4B:
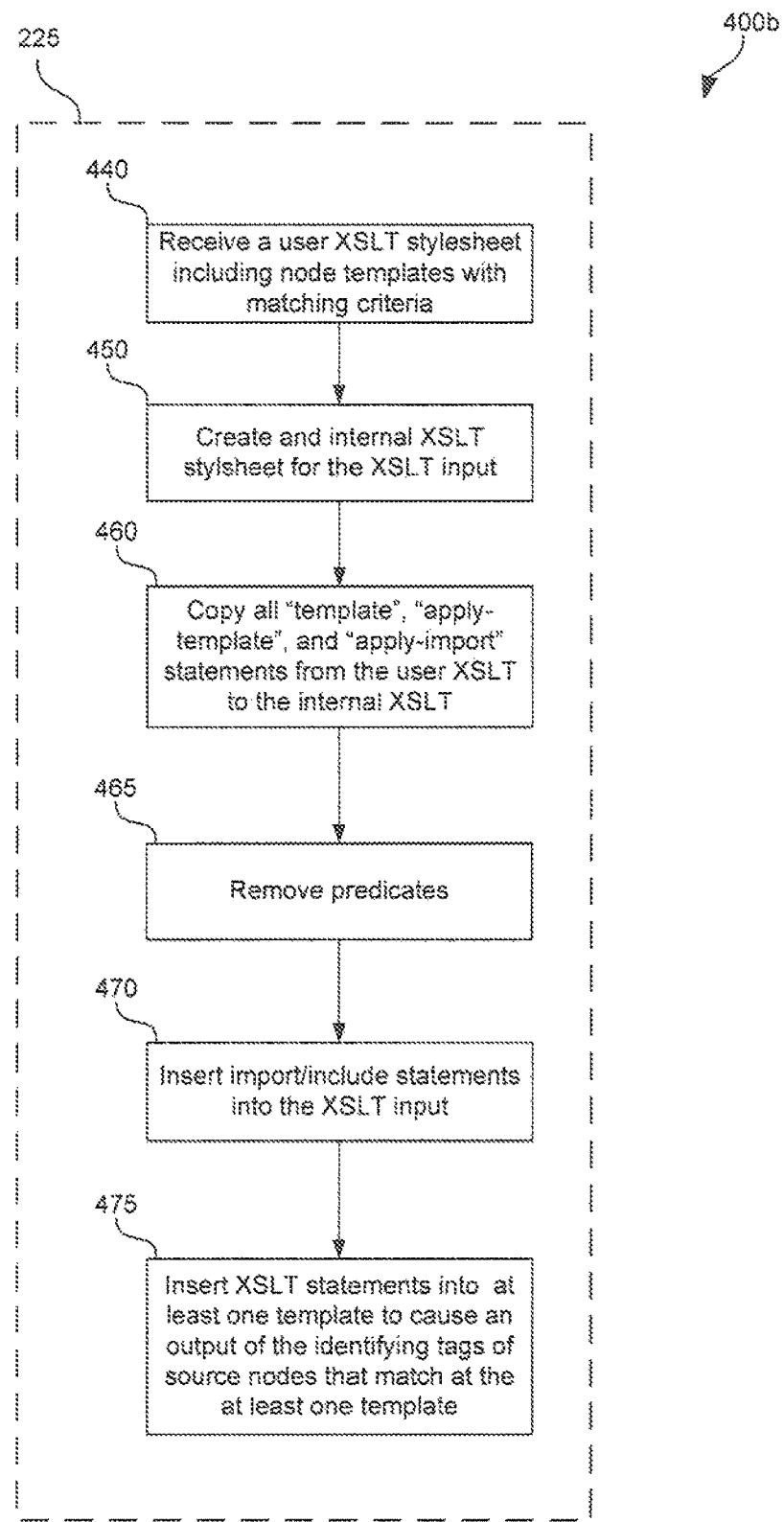
FIG. 4B illustrates a flow chart of a method for generating an XSLT input, according to one embodiment.

In one embodiment, the method in FIG. 4A may be implemented by a XSLT style sheet. FIG. 4B illustrates a flow chart 400*b* of a method for generating an XSLT input, according to one embodiment. At step 440 a user XSLT style sheet including node templates and matching expressions may be received. The user XSLT style sheet may be loaded from memory, may be selected by the user in response to a request, and/or may be generated by the user in a source editor. At step 450, an internal XSLT style sheet may be created from the user XSLT style sheet to be used as the XSLT input for an XSLT processor. As with the XML input, the XSLT input may or may not be visible to the user, and may be controlled according to user settings.

At step 460 or more of the <template>, <apply-templates>, and <apply-imports> statements from the user XSLT may be copied into the XSLT input. As with the XML input, by including only essential statements, the size of the input file may be reduced. This may result in faster processing time and/or a lower demand on resources of a computer system. At step 465, predicates may be removed from the <xsl:template> statements. In XSLT, a predicate is an expression used to match a template to an element according to run-time data conditions. In one embodiment, the method may be used during design-time, and thus there may be no run-time data available. For example, a template-matching expression may be comprised of a statement such as <xsl:template match="book[price/currency='USD']">. The portion of the statement in the in the square brackets is a predicate, and could be read as "match book elements where the book's price/currency field has the value of 'USD'." Because some embodiments remove the run-time data from the XML input, only the structure of the XML may be available. In these cases, there may be no run-time data, such as a value in the price/currency field, and the predicates that rely on these data may be removed from the XSLT.

At step 470, the necessary contents of any import/include statements may be inserted into the XSLT input. At step 475, code may be inserted into one or more of the XSLT templates. The code may be configured to extract the unique identifier for each context node that is processed by the templates. This code may be added selectively. For example, if a user only needs to know which context nodes are processed by a particular template, the code may be inserted into that template and omitted from others. This may minimize processing time delay. If at a later time a user selects a different template an/or XML element, the output code may be removed from the first template and insert it into the second template.

Figure 4C:
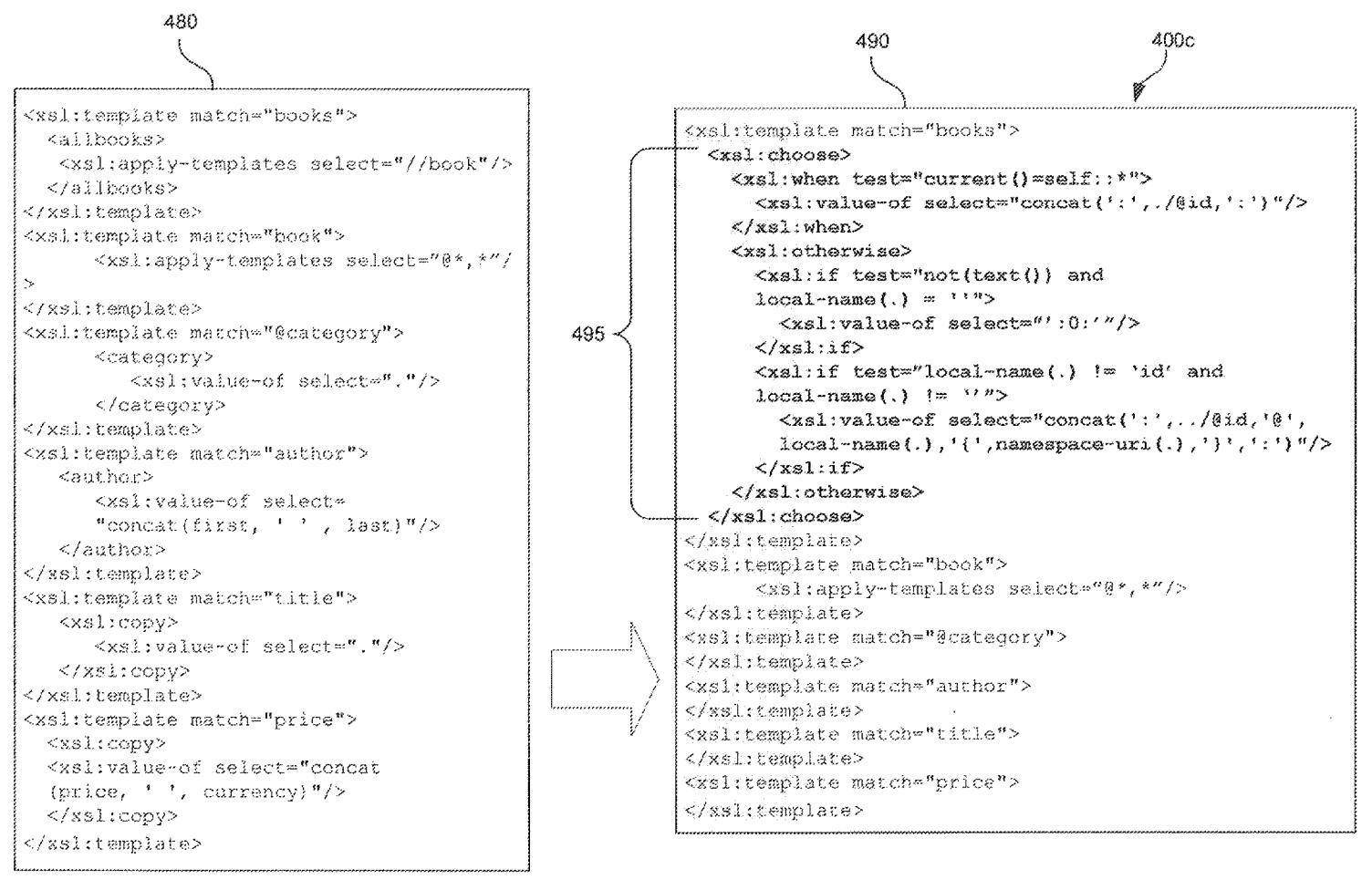

FIG. 4C illustrates a block diagram 400*c* for generating an XSLT input, according to one embodiment. File 480 may include definitions related to a user XSLT input. File 480 includes multiple template definitions that may be used to process an XML file related to an inventory of books. File 490 represents an XSLT input that may have been derived from the user XSLT input in file 480. Note that the <xsl:template> and <xsl:apply-templates> statements have been preserved from file 480. In this embodiment, only one template is selected for matching, namely the <xsl:template match="books"> template. The body of this template includes code 495 that has been inserted according to this selection. The first section of code 495 is configured to look for XML elements. The second section of code 495 is configured to look for the root node. The third section of code 495 is configured to look for the XML attributes. Code 495 may be added to any and all of the template blocks in file 490. For example, code 495 could also be added to the <xsl:template match="author"> template in addition to the <xsl:template match="books"> template.

When the first input is implemented with an XML file, and the second input is implemented with an XSLT file, then the processing function 130 in FIG. 1 may be implemented using an XSLT processor. An XSLT processor may comprise a software module in a source editing application run on a computer system, such as computer system or 900 described hereinbelow in FIG. 9. The source editor may include an XSLT processor in order to format XML according to XSLT style sheets. However, one embodiment may also use the XSLT processor in the background to match XML elements XSLT templates. No alterations need be made to the functionality of the XSLT processor. The XML input generated in FIG. 3B and the XSLT input generated in FIG. 4B may be passed to the XSLT processor as regular inputs. The XSLT processor may process these inputs and generate the resulting outputs as it would with any other files.

In another embodiment, the XSLT processor may be configured to operate in a plurality of modes. The first mode may be used to process user inputs, and a second mode may be used specifically to determine context nodes for XSLT templates. The second mode may optimize the XSLT processor operations, and tailor its functionality such that determining context nodes requires less processing power and/or resources than processing regular XML and XSLT files.

The first input comprising an XML file and the second input comprising an XSLT file may be derived from user XML and XSLT inputs as a background process in a source editor. The source editor may periodically run the first input and the second input through the XSLT processor at times when the user's source code is not being compiled. Thus, context nodes may continuously be determined in relation to XSLT templates as a user is editing the source code without interfering with the normal operations of the source editor. Such operations may take place in real-time.

Figure 5A:
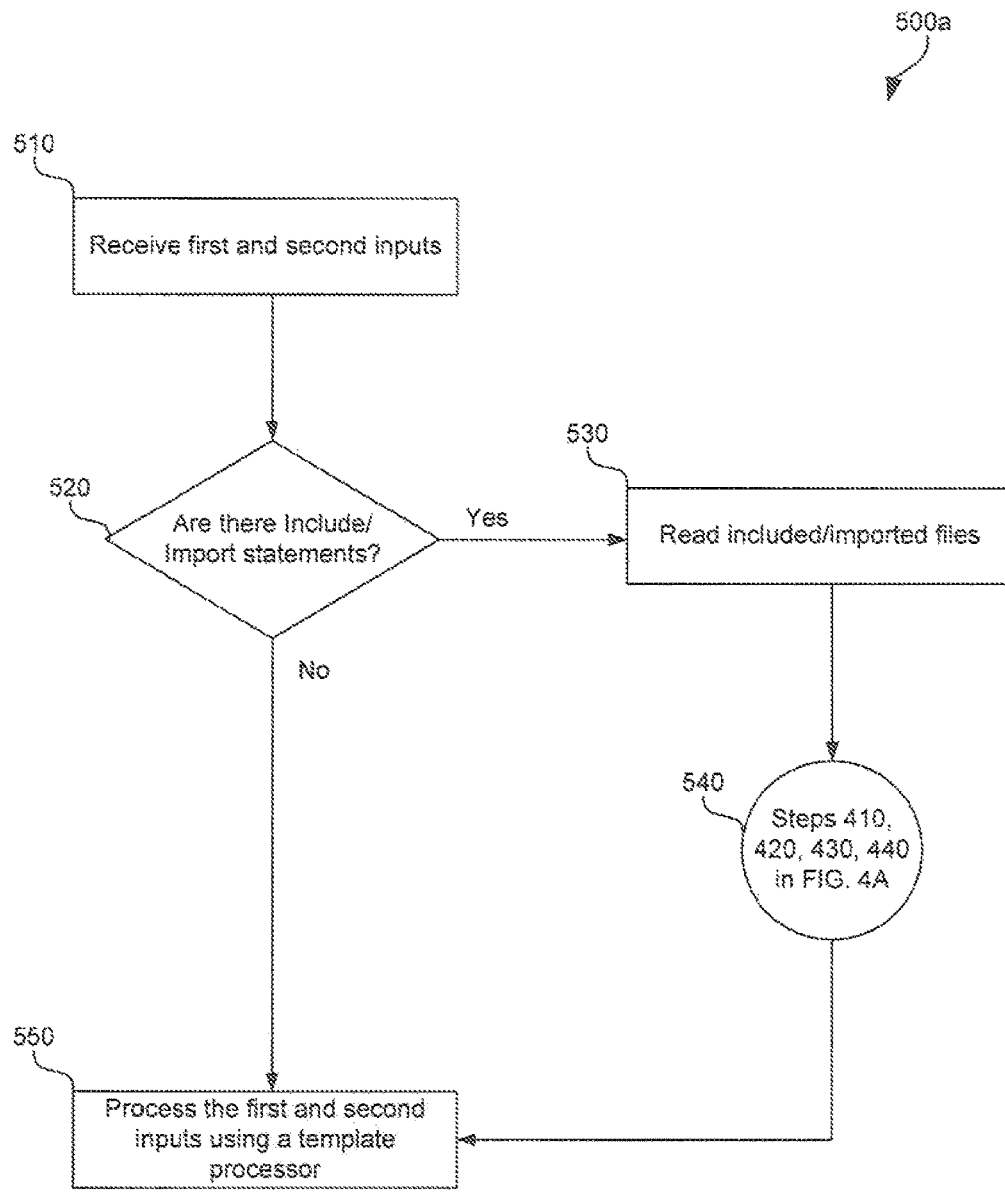
FIG. 5A illustrates a flow chart of a method for processing the first and second inputs, according to one embodiment.

FIG. 5A illustrates a flow chart 500*a* of a method for processing the first and second inputs. This processing may be done by a processing function such as a template processor, or in one embodiment, an XSLT processor. At step 510, the first and second inputs may be received by a template processor. At step 520, the second input may be analyzed to determine whether there are any include or import statements. Include and/or import statements may direct the template processor to process source code from another file, database, Web resource, memory, library, and/or the like. If there are no import or include statements that require processing, then the first and second inputs may be processed by the template processor at step 550. Note that code from the import/include files may also be included inline in the first input by step 430 of FIG. 4A, and thus not require processing separate files.

On the other hand, if there are include and/or import statements that require processing they may be imported into the code base of a source editor. Any additional files or code segments that are imported or included in step 530 may contain instructions and definitions that are not essential to the template matching process. In order to minimize the required processing resources, temporary input files may be derived from the imported and/or included files in the same way that the first and second input files may be derived from user input files. This process may be accomplished by following the method of FIG. 4A. Specifically, included and/or imported files at may be received at step 410, a new input file may be created by extracting the template definitions at step 420, any imported or included statements in the imported and/or included files may also be imported at step 430, and output code may be inserted into the templates at step 440.

Included files may contain other include statements that for step 540 may be carried out recursively to generate a complete input file. In one embodiment, this process need only be done one time, and the generated files saved in memory for use each time context nodes are matched to templates. Furthermore, the computer system may determine that imported and/or include statements reference code that is not needed to match context nodes and templates. In this case, the import and/or include statements may simply be omitted.

Figure 5B:
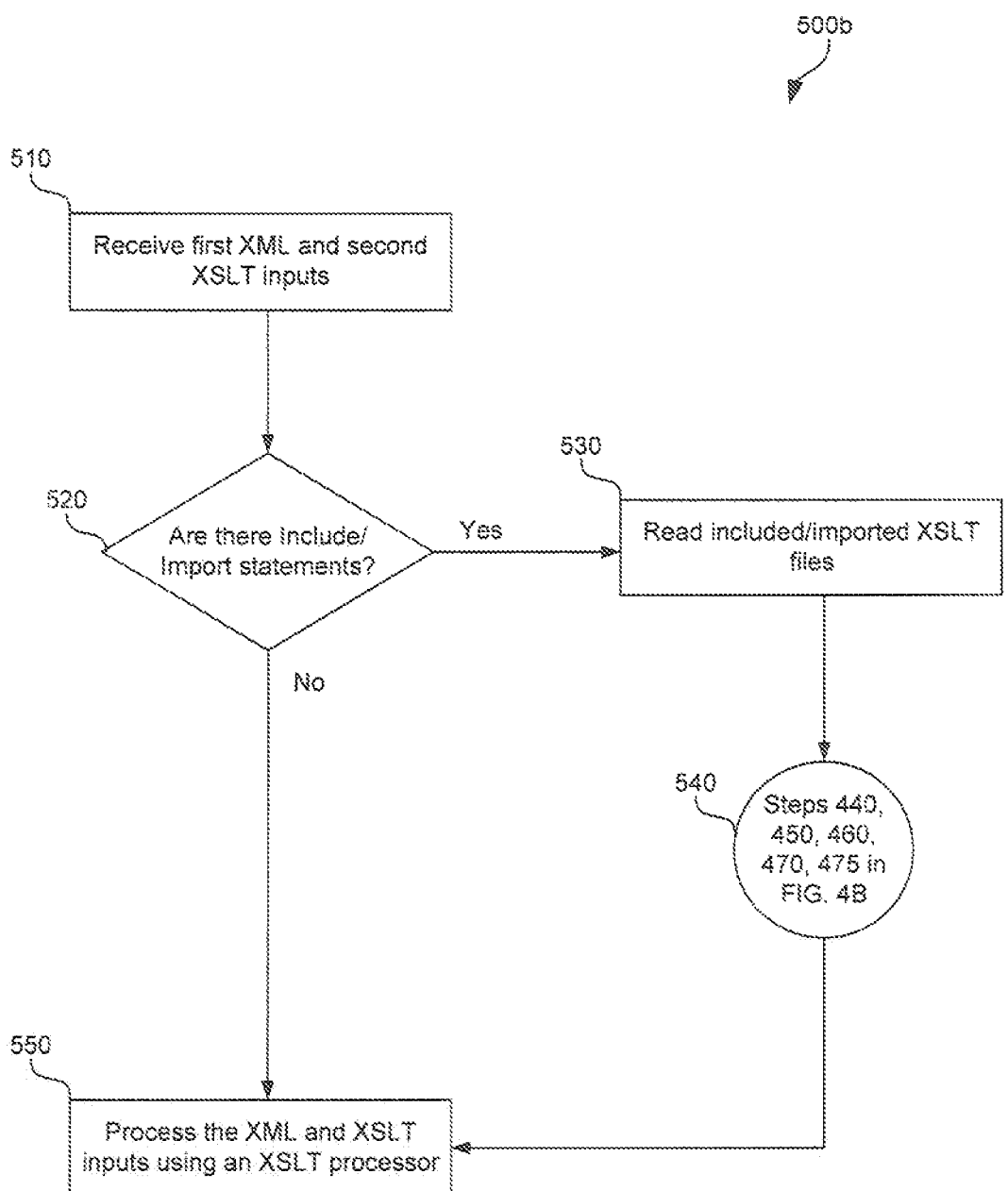
FIG. 5B illustrates a flow chart of a method for processing the first XML input and the second XSLT input, according to one embodiment.

FIG. 5B illustrates a flow chart 500*b* of a method for processing the first XML input and the second XSLT input. At step 510, the first XML input in the second XSLT input may be received. At step 520, the first XML input in the second XSLT input may be inspected for include and/pr import statements. If no such statements are found in either input, then the XSLT processor may process the first XML input in the second XSLT input in the usual fashion at step 550. If either input contains include and/or import statements, the reference source code may be read and prepare for processing according to the method in FIG. 4B at step 540. After any imported and/or included files have been prepared for processing, all of the input files may be processed by the XSLT processor at step 550. Note that the method in FIG. 5B is similar to the method in FIG. 5A, except it is specially tailored for processing XML and XSLT inputs.

Figure 6A:
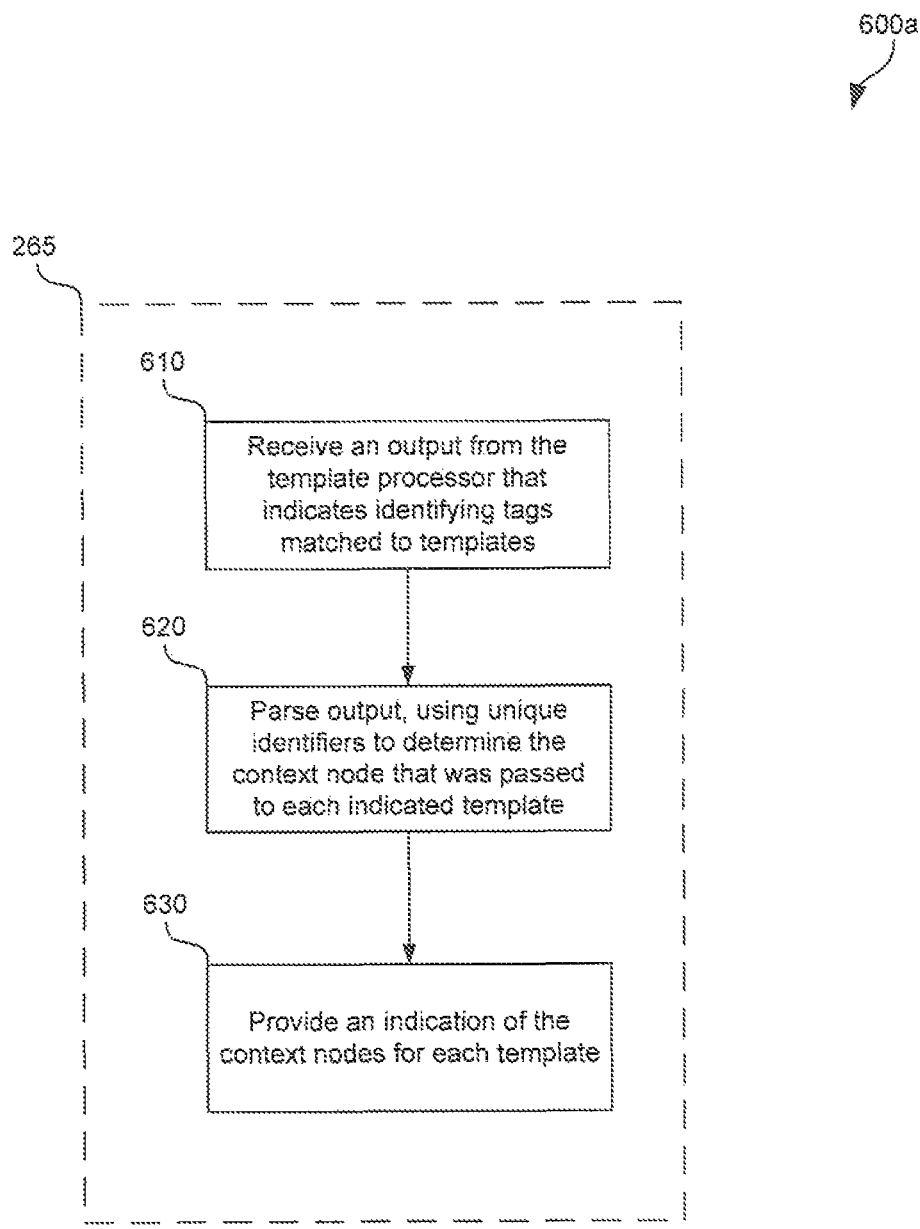
FIG. 6A illustrates a flow chart of a method for processing an output, according to one embodiment.

The template processor may be instructed to provide an output that maps context nodes to templates as described in step 260 of FIG. 2. The output processing steps in group 265 of FIG. 2 may be expanded and/or added upon. FIG. 6A illustrates a flow chart 600a of a method for processing an output, according to one embodiment. At step 610, an output file may be received from the template processor that indicates which unique identifiers are processed by each template containing output code. If the input files were derived from user inputs, such that unnecessary code was removed, then the output containing the template and context node mapping may be the only output. However, if any other code remained in either of the inputs, then other outputs that are nonessential to context node and template mapping may also be generated. For example, if a template included in the second user input included code configured to cause an HTML output, and that code was not removed from the second input, then that code could generate an HTML output in addition to the context node template mapping output. These outputs may be in the same file or data stream, or they may be in separate files or data streams.

At step 620, the output may be parsed according to an output format. For example, the output code in the templates of the second input may direct the template processor to print a line of text identifying the template followed by a line of text including the unique identifier for each context node that is processed by the template. Parsing this output format may include finding each template name and determining the names of the context nodes according to the unique identifiers. Other formats are possible, including XML outputs, HTML outputs, text outputs, serialized outputs, and/or the like.

At step 630, an indication may be provided describing the context nodes that were matched to each template. This indication may be textual or graphical. In one embodiment, the names of context nodes in a source editor may be emphasized along with the names of the matching templates. This emphasis may include underlining, highlighting, fonts, font styles, and/or the like. The emphasis of the context node and the emphasis of the matching template may be coordinated such the connection may be clear to a user. In another embodiment, hovering the mouse over the context node may cause a mouse-over event wherein the name of the matching template may be displayed. Similarly, hovering the mouse over the template may cause a mouse over event wherein the name of the matching context node may be displayed.

The indication in step 630 also may be graphical. In one embodiment, a graphical indication may be provided such as connecting lines between the template and a matching context nodes. In another embodiment an icon may be provided representing the template, and lines may be drawn to the context nodes that act as inputs to the template icon. In yet another embodiment, the context nodes may be arranged on the screen relative to the template such that any relationship between the two is made clear based on their positioning. It should be clear in light of this disclosure that any graphical representation may be used, wherein the relationship between the template matching context nodes is visually represented.

Figure 6B:
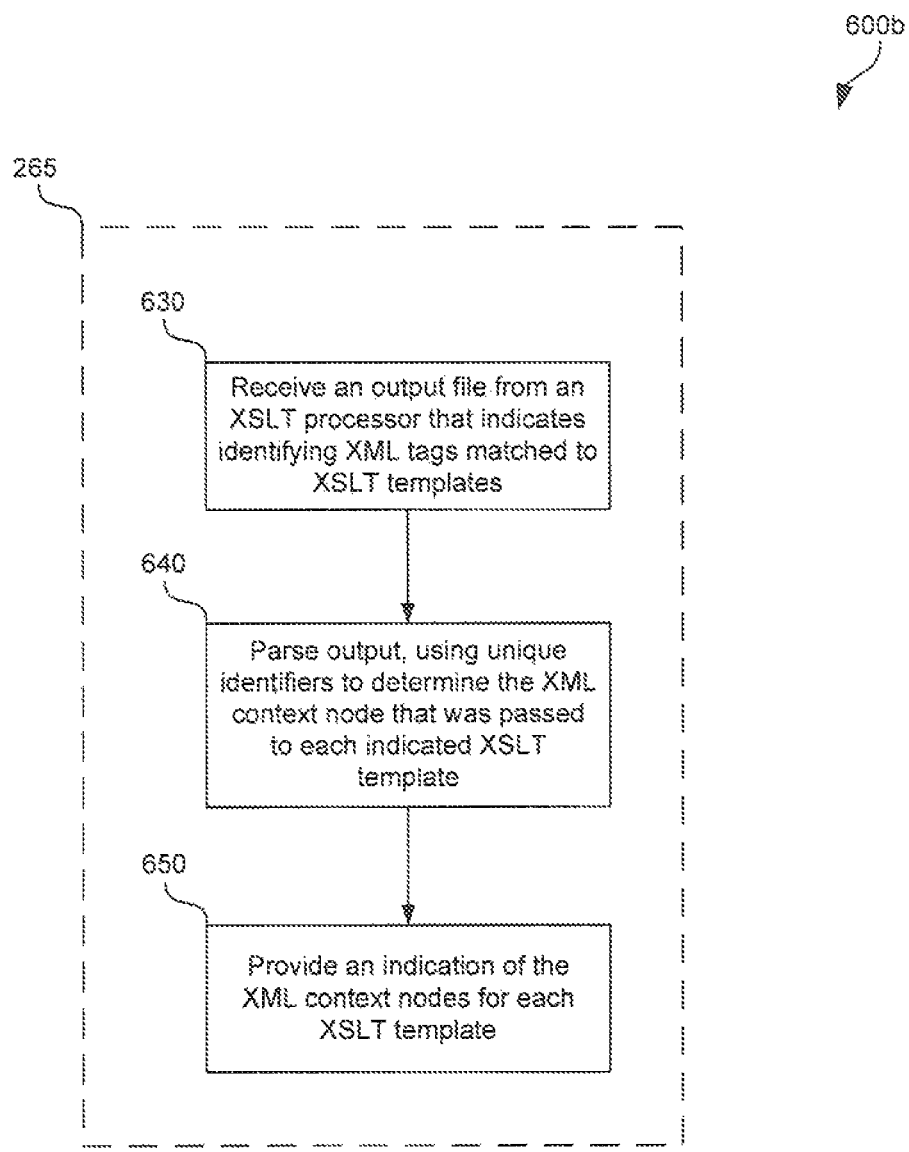
FIG. 6B illustrates a flow chart of a method for processing an output of an XSLT processor, according to one embodiment.

FIG. 6B illustrates a flow chart 600b of a method for processing an output of an XSLT processor, according to one embodiment. At step 630, output from the XSLT processor may be received. The output may indicate XML tags and/or other unique identifiers for each context node processed by each XSLT template. At step 640, a received output may be parsed, and the unique identifiers may be used to determine the context nodes that are processed by each template. At step 650, an indication may be provided identifying each XML context node and linking them to the XSLT templates. For example, if a source editor is used, a context node may be highlighted an XML editor window, and may be graphically linked to the XSLT template in an XSLT editor window.

Figure 6C:
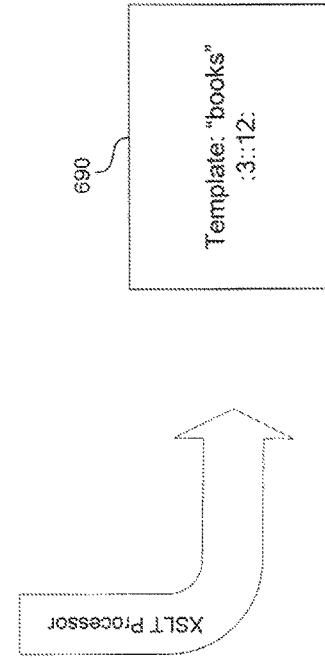
FIG. 6C illustrates a block diagram for generating output, according to one embodiment.

FIG. 6C illustrates a block diagram 600c for generating output, according to one embodiment. XML file 670 includes XML code where each element of interest has had a unique identifier added. For example every instance of the <book> element has been given an attribute named "id". Note that two book elements exist, one under the <sale> element, and one under the <books> element, with id's 3 and 12 respectively.

XSLT file 680 includes an XSLT template for which output code has been an added. The output code is configured to print the name of the template and an "id" of every context node that the template processes. When the XSLT processor processes XML file 670 with XSLT file 680, output 690 may result. For example, output 690 indicates that the template named <books> may have processed two context nodes with an "id" of 3 and 12. Output 690 may be textual in a file such as an HTML file, ah XML file, a TXT file, a PDF file, and/or the like. Output 690 may also be in the form of a data stream is provided as an input to a software process. For example, output 690 may be a data stream for a data input to a text editor that uses a template processor to graphically link context nodes to templates in one or more editor windows.

Figure 7A:
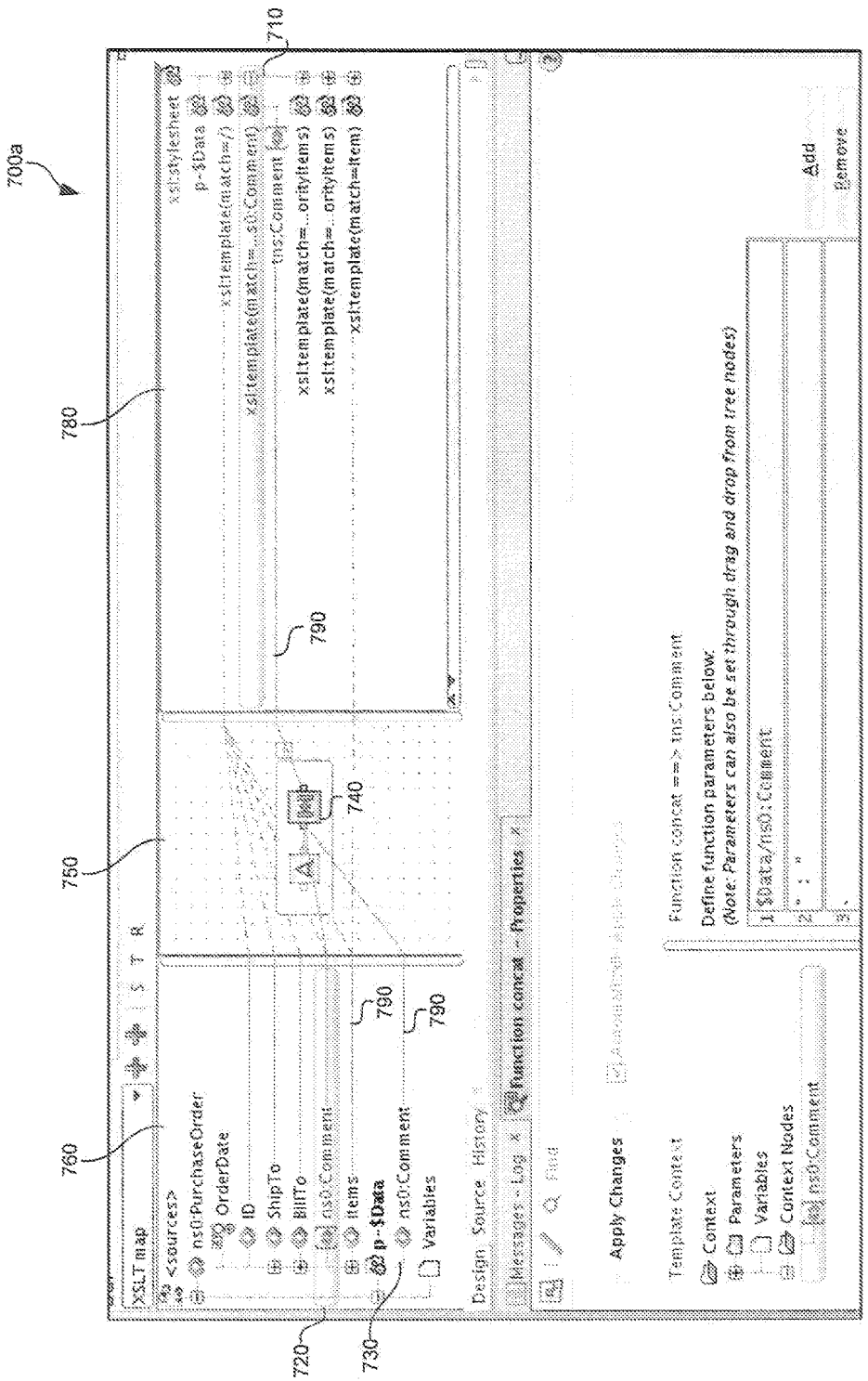
FIG. 7A is a user interface for using the XSLT processor to determine context nodes for design-time display, according to one embodiment of the present invention.

Many different types and style of text editors may be used. FIG. 7A illustrates an interface 700a for an XSLT editor. Interface 700a may include a graphical link between XSLT templates and the corresponding processed context nodes. For example an XPath function 740 linked to a template 71 is included an a middle window 750. In an XML source window, 760 context nodes 720, 730 for the XML element <Comment> are displayed in an XML hierarchy. In a template source window 780, an XSLT template 710 is listed that may match the <Comment> node. Graphical indicators 790 are used to link the XSLT template 710 with the context node 720 together via the XPath function 740 in the middle window 750. Graphical indicators 790 may be generated from the output of the template processor. For example, output 690 of FIG. 6C may be parsed by a source editor and used to generate graphical indicators 790. It is important to note that in XPath there are various ways to refer to an XML element. Thus, simply examining the match expression of a template and finding nodes with the same name is not sufficient. For example, the current XML node may be referred to as "." and this will depend on the context of the XPath expression when is it processed by the XSLT processor. Simply matching expressions to XML element names will not find context nodes that are referenced most types of relative XPath expressions.

The interface 700a is not limited to merely parsing the output of a template processor, and displaying links between context nodes and templates. In another embodiment, the interface 700a may also be used to generate matching expressions for templates. For example context node 720 may be dragged to the XPath function 740 in the middle window 750. From this, a matching expression may be generated to match context node 720. In this case, the node 720 may be the context node for the template 790 and may be referred to by ".". This can be seen in the lower panel as the third argument to the XPath function. Alternatively, an existing template may be dragged to the XPath function 740, and an existing path expression may be modified from an absolute XPath to a relative XPath, relative to the context node of the template.

Figure 7B:
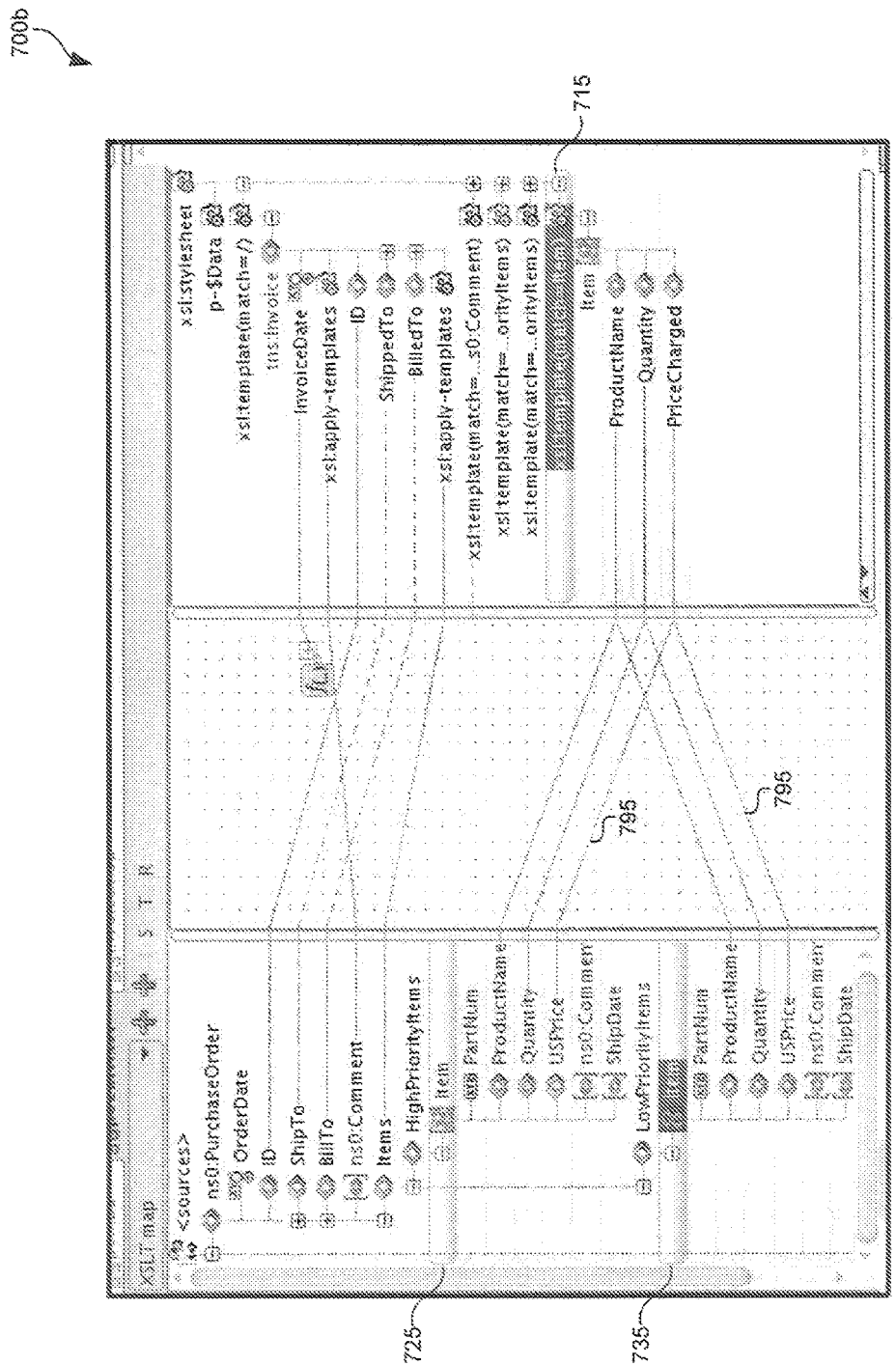
FIG. 7B is a user interface for using the XSLT processor to determine context nodes for design-time display, according to one embodiment of the present invention.

FIG. 7B illustrates an interface 700b for an XSLT editor, according to one embodiment. Interface 700B includes graphical indicators 795 that link multiple context nodes 725, 735. Note that in this example, context nodes 725, 735 may have different XPath references. Although context node 725 may have an XPath reference that includes "HighPriorityItems", and context node 735 may have an XPath reference that includes "LowPriorityItems", both context node 725 and context node 735 are correctly linked to the XSLT template 715 with a matching expression of "item". Previous XML source editors are not known to have been able to achieve this type of matching successfully.

Figure 8:
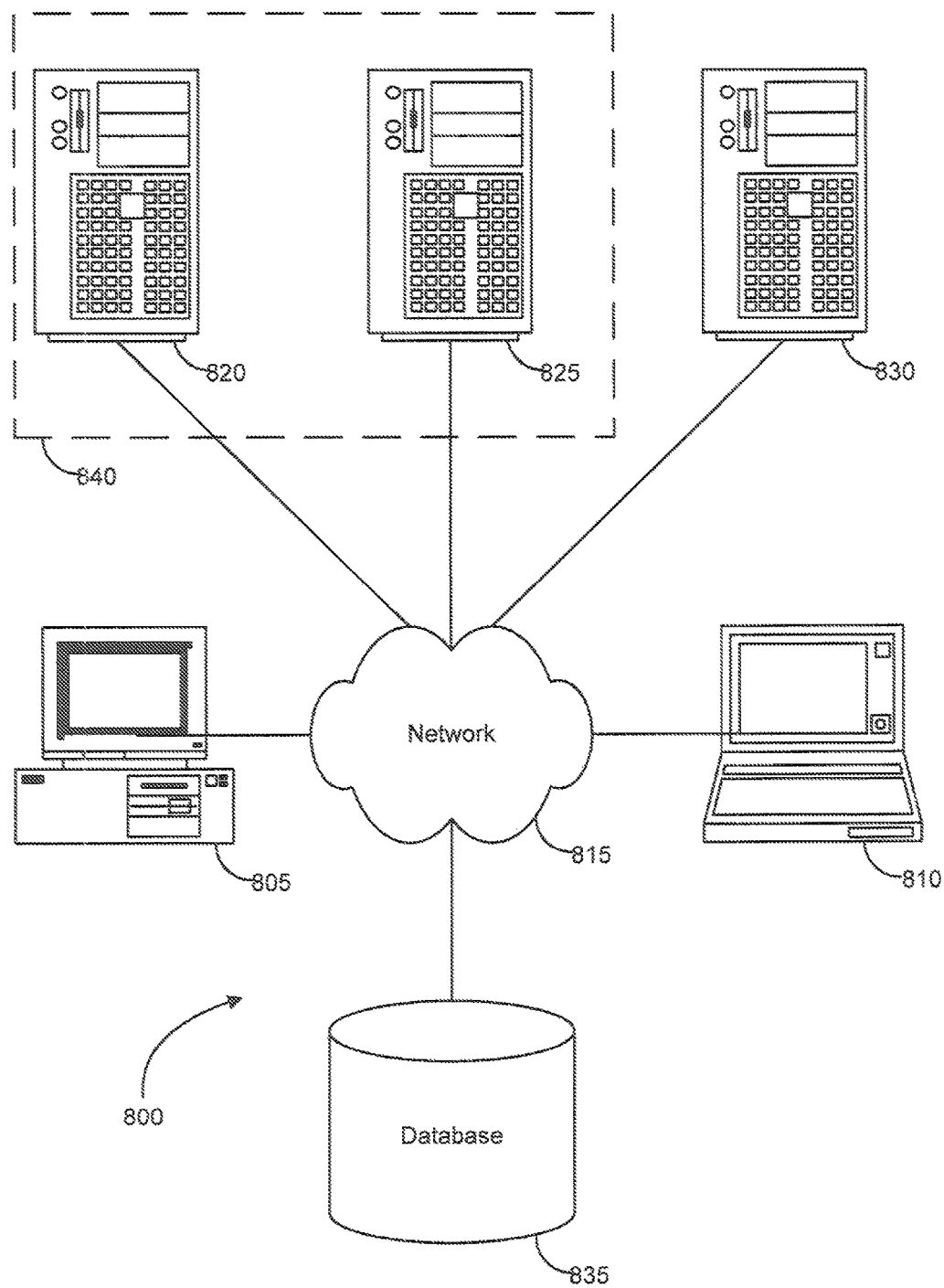
FIG. 8 is a block diagram illustrating components of an exemplary operating environment in which various embodiments of the present invention may be implemented.

Interface 700a and interface 700b may be implemented on a computer system. Additionally, each of the actions taken in linking context nodes to templates may be the result of interactions between user and the computer system, or may be autonomously carried out by the computer system alone. FIG. 8 is a block diagram illustrating components of an exemplary operating environment in which various embodiments of the present invention may be implemented. The system 800 can include one or more user computers 805, 810, which may be used to operate a client, whether a dedicate application, web browser, etc. The user computers 805, 810 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 805, 810 may also have any of a variety of applications, including one or more development systems, database client and/or server applications, and web browser applications. Alternatively, the user computers 805, 810 may be any other electronic device, such as a thin-client computer, Internet-enabled mobile telephone, and/or personal digital assistant, capable of communicating via a network (e.g., the network 815 described below) and/or displaying and navigating web pages or other types of electronic documents. Although the exemplary system 800 is shown with two user computers, any number of user computers may be supported.

In some embodiments, the system 800 may also include a network 815. The network may can be any type of network familiar to those skilled in the art that can support data communications using any of a variety of commercially-available protocols, including without limitation TCP/IP, SNA, IPX, AppleTalk, and the like. Merely by way of example, the network 815 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3 G, 2.5 G, CDMA, CPMA2000, WCDMA, EVDO etc.

The system may also include one or more server computers 820, 825, 830 which can be general purpose computers and/or specialized server computers (including, merely by way of example, PC servers, UNIX servers, mid-range servers, mainframe computers rack-mounted servers, etc.). One or more of the servers (e.g., 830) may be dedicated to running applications, such as a business application, a web server, application server, etc. Such servers may be used to process requests from user computers 805, 810. The applications can also include any number of applications for controlling access to resources of the servers 820, 825, 830.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 805, 810. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 805, 810.

In some embodiments, an application server may create web pages dynamically for displaying on an end-user (client) system. The web pages created by the web application server may be forwarded to a user computer 805 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 800 may also include one or more databases 835. The database(s) 835 may reside in a variety of locations. By way of example, a database 835 may reside on a storage medium local to (and/or resident in) one or more of the computers 805, 810, 815, 825, 830. Alternatively, it may be remote from any or all of the computers 805, 810, 815, 825, 830, and/or in communication (e.g., via the network 820) with one or more of these. In a particular set of embodiments, the database 835 may reside in a storage-area network ("SAN") familiar to those skilled in the art. Similarly, any necessary files for performing the functions attributed to the computers 805, 810, 815, 825, 830 may be stored locally on the respective computer and/or remotely, as appropriate. In one set of embodiments, the database 835 may be a relational database, such as Oracle 10g, that is adapted to store, update, and retrieve data in response to SQL-formatted commands.

Figure 9:
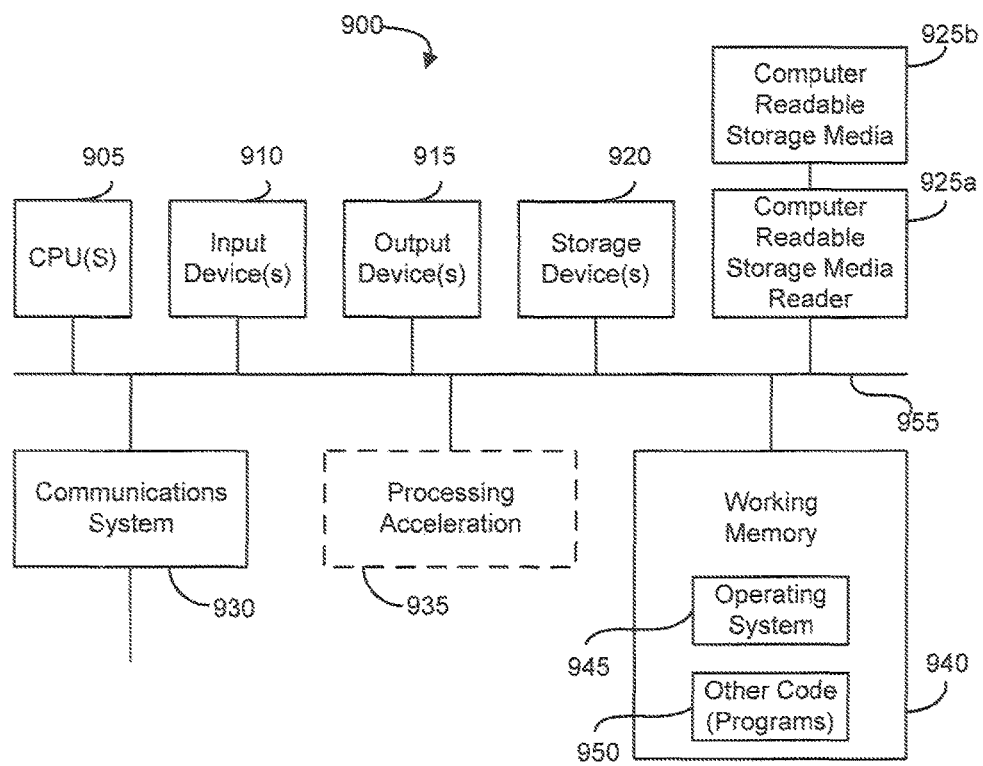
FIG. 9 is a block diagram illustrating an exemplary computer system in which embodiments of the present invention may be implemented.

FIG. 9 illustrates an exemplary computer system 900, in which various embodiments of the present invention may be implemented. The system 900 may be used to implement any of the computer systems described above. The computer system 900 is shown comprising hardware elements that may be electrically coupled via a bus 955. The hardware elements may include one or more central processing units (CPUs) 905, one or more input devices 910 (e.g., a mouse, a keyboard, etc.), and one or more output devices 915 (e.g., a display device, a printer, etc.). The computer system 900 may also include one or more storage device 920. By way of example, storage device(s) 920 may be disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 925a, a communications system 930 (e.g., a modem, a network card (wireless or wired), an infra-red communication device, etc.), and working memory 940, which may include RAM and ROM devices as described above. In some embodiments, the computer system 900 may also include a processing acceleration unit 935, which can include a DSP, a special-purpose processor and/or the like.

The computer-readable storage media reader 925a can further be connected to a computer-readable storage medium 925b, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 920 and/or any other computer described above with respect to the system 900.

The computer system 900 may also comprise software elements, shown as being currently located within a working memory 940, including an operating system 945 and/or other code 950, such as an application program (which may be a client application, web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed. Software of computer system 900 may include code 950 for implementing embodiments of the present invention as described herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:
receiving a first input comprising a first data instance;
selecting a unique identifier and adding the unique identifier to the first data instance in the first input;
receiving a second input comprising a first template, wherein the first template is an XSLT stylesheet, wherein generation of the second input comprises:
copying one or more template statements into the XSLT stylesheet; and
removing predicates from the one or more template statements;
adding output instructions to the first template, wherein:
the first template comprises instructions for processing the first data instance; and
the output instructions are configured to instruct an XSLT processor to provide an output, the output comprising:
identifying information for the first template; and
the unique identifier of the first data-instance;
processing the first input and the second input with the XSLT processor, wherein the XSLT processor is configured to process data instances according to instructions within a template definition of the first template, to determine context nodes, and to perform processing during design time editing and deployment of the XSLT stylesheet;
mapping, by the XSLT processor, data instances in the first input to the first template in the second input in order to indicate an association of the data instances with the first template; and
outputting, by the XSLT processor, the mapping of data instances,
wherein the mapping that is output by the XSLT processor includes the unique identifier of the first data instance of the first input matched with the first template of the second input in order to identify one or more context nodes for the first template during design time editing, in which)(Path expressions are generated in accordance with the one or more context nodes.

2. The method of claim 1, further comprising:
receiving a first user input comprised of a plurality of data instances, wherein the first data instance is included in the plurality of data instances; and
creating the first input by extracting data from the first user input that are associated with instantiations of the plurality of data instances or with relationships between one or more of the plurality of data instances.

3. The method of claim 1, further comprising:
receiving a second user input comprised of a plurality of template definitions, wherein the first template is included in the plurality of template definitions; and
creating the second input by extracting instructions from the second user input that are associated with matching templates to data instances.

4. The method of claim 3, wherein creating the second input further comprises importing instructions that are associated with matching data templates to instances from a third input that is referenced by the second user input.

5. The method of claim 1, further comprising:
receiving, in response to the processing of the first input and the second input, the output generated by the XSLT processor, wherein the output comprises:
the identifying information for the first template;

the unique identifier of the first data instance; and
an indication that the first data instance was processed by the XSLT processor according to the first template.

6. The method of claim 5, further comprising:
parsing the output generated by the XSLT processor; and
providing an indication to a user that the first data instance matches the first template.

7. The method of claim 6, further wherein providing the indication to the user is comprised of providing a graphical indication in a source editor.

8. The method of claim 1, wherein:
the first template includes a reference to run-time data; and
the reference to the run-time data is removed from the second input prior to being processed by the XSLT processor.

9. The method of claim 1, wherein the first input and the second input are generated automatically from a first user input file and a second user input file, respectively.

10. A system comprising:
a computer including a computer readable medium and processor;
an XSLT processor operating on the computer; and
a storage device, connected to the computer, having sets of instructions stored thereon, wherein the sets of instructions, cause the system to:
receive an XML input comprising a first XML, element;
select and add a unique identifier as an attribute to the first XML element;
receive an XSLT input comprising a first template, wherein the first template is an XSLT stylesheet, wherein generation of the second input comprises:
copying one or more template statements into the XSLT stylesheet; and removing predicates from the one or more template statements;
add output code to the first template, wherein
the first template comprises code for processing the first XML element;
the first template comprises an expression that matches the first template with the first XML element; and
the output code is configured to instruct the XSLT processor to provide an output, the output comprising:
identifying information for the first template; and
the unique identifier of the first XML, element; and
process the XML input and the XSLT input with the XSLT processor, wherein the XSLT processor is configured to process data instances according to instructions within a template definition of the first template, to determine context nodes, and to perform processing during design time editing and deployment of the XSLT stylesheet;
map, by the XSLT processor, XML elements in the XML input to the first template in the XSLT input in order to indicate an association of the XML elements with the first template; and
output, by the XSLT processor, the mapping of the XML elements in the XML input,
wherein the mapping that is output, by the XSLT processor, includes the unique identifier of the first XML element of the XML input matched with the first template of the XSLT input in order to identify one or more context nodes for the first template during design time editing, in which XPath expressions are generated in accordance with the one or more context nodes.

11. The system of claim 10, wherein the instructions further cause the system to:
receive a user XML input comprised of a plurality of XML elements, wherein the first XML element is included in the plurality of XML elements; and
create the XML input by extracting code from the user XML input that is associated with the plurality of XML elements or with a relationship between one or more of the plurality of XML elements.

12. The system of claim 10, wherein the instructions further cause the system to:
receive a user XSLT input comprised of a plurality of template definitions, wherein the first template is included in the plurality of template definitions; and
create the XSLT input by extracting code from the user XSLT input that is associated with matching templates to data instances.

13. The system of claim 12, wherein creating the XSLT input further comprises extracting code from the user XSLT input that directs the XSLT processor to apply templates.

14. The system of claim 10, wherein the instructions further cause the system to:
receive, in response to the processing of the XML input and the XSLT input, the output generated by the XSLT processor, wherein the output comprises:
the identifying information for the first template;
the unique identifier of the first XML element; and
an indication that the first XML element was processed by the XSLT processor according to the first template.

15. The system of claim 10, wherein the instructions further cause the system to:
parse the output generated by the XSLT processor; and
provide an indication to a user that the first XML element matches the first template according to the expression of the first template.

16. The system of claim 15, further wherein providing the indication to the user is comprised of providing a graphical indication in an XML source editor.

17. The system of claim 10, wherein;
the first template includes a relative XPath expression; and
the relative XPath expression is removed from the XSLT input prior to being processed by the XSLT processor.

18. The system of claim 10, wherein the XML input and the XSLT input are generated automatically from a user XML input file and a user XSLT input file, respectively.

19. A non-transitory computer-readable medium for using an XSLT processor to determine context nodes for design-time display, having sets of instructions stored thereon, which when executed by a computer system, cause the computer system to:
receive an XML input comprising a first XML element;
select and add a unique identifier as an attribute to the first XML element;
receive an XSLT input comprising a first template, wherein the first template is an XSLT stylesheet, wherein generation of the second input comprises:
copying one or more template statements into the XSLT stylesheet; and
removing predicates from the one or more template statements;
add output code to the first template, wherein
the first template comprising code for processing the first XML element;

the first template comprising an expression that matches the first template with the first XML element; and the output code is configured to instruct the XSLT processor to provide an output, the output comprising:
identifying information for the first template; and
the unique identifier of the first XML element; and process the XML input and the XSLT input with the XSLT processor, wherein the XSLT processor is configured to process data instances according to instructions within a template definition of the first template, to determine context nodes, and to perform processing during design time editing and deployment of the XSLT stylesheet;

map, by the XSLT processor, XML elements in the XML input to the first template in the XSLT input in order to indicate an association of the XML elements with the first template; and output, by the XSLT processor, the mapping of the XML, elements, wherein the mapping that is output by the XSLT processor includes the unique identifier of the first XML element of the XML input matched with the first template of the XSLT input in order to identify one or more context nodes for the first template during design time editing, in which XPath expressions are generated in accordance with the one or more context nodes.

20. The non-transitory computer-readable medium for using the XSLT processor to determine context nodes for design-time display of claim 19, wherein the sets of instructions further cause the computer system to:

receive a user XML input comprised of a plurality of XML elements, wherein the first XML element is included in the plurality of XML elements; and create the XML input by extracting code from the user XML input that is associated with the plurality of XML elements or with a relationship between one or more of the plurality of XML elements.

21. A method comprising:

receiving a first input comprising a first data instance and a second data instance;

selecting and adding a first unique identifier to the first data instance and a second unique identifier to the second data instance in the first input;

receiving a second input comprising a first template and a second template, wherein the first template is an XSLT stylesheet, wherein generation of the second input comprises:
copying one or more template statements into the XSLT stylesheet; and
removing predicates from the one or more template statements;

adding first output instructions to the first template and adding second output instructions to the second template, wherein:

the first template comprises first instructions for processing the first data instance and the second template comprises second instructions for processing the second data-instance; and the first output instructions and the second output instructions are configured to instruct an XSLT processor to provide a mapping output, the mapping output comprising:
identifying information for the first template and the second template; and
the first unique identifier of the first data instance and the second unique identifier of the second data instance;

matching the first data instance with the first template and matching the second data instance with the second template;

processing the first input and the second input with the XSLT processor, wherein the XSLT processor is configured to process the first data instance according to the first instructions in the first template and process the second data instance according to the second instructions in the second template, to determine context nodes, and to perform processing during design time editing and deployment of the XSLT stylesheet;

mapping, by the XSLT processor, data instances in the first input to the first template in the second input in order to indicate an association of the data instances with the first template; and outputting by the XSLT processor the mapping of data instances, wherein the mapping that is output includes the first unique identifier of the first data instance of the first input matched with one of the first template and the second template of the second input and the second unique identifier of the second data instance of the first input matched with one of the first template and the second template of the second input in order to identify one or more context nodes for each of the first template and the second template during design time editing, in which XPath expressions are generated in accordance with the one or more context nodes.

22. The method according to claim 1, wherein the XSLT processor is configured to process an XML input that is the first input in accordance with an XSLT style sheet that is the second input.

23. The method according to claim 1, wherein the mapping that is output by the XSLT processor includes a plurality of unique identifiers of a plurality of inputs matched with a plurality of templates in order to identify a plurality of context nodes for each of the plurality of templates.

* * * * *

UNITED STATES PATENT AND TRADEMARK OFFICE
CERTIFICATE OF CORRECTION

PATENT NO. : 10,180,931 B2
APPLICATION NO. : 13/368300
DATED : January 15, 2019
INVENTOR(S) : Freese It is certified that error appears in the above-identified patent and that said Letters Patent is hereby corrected as shown below:

In the Drawings

On sheet 7 of 17, in FIG. 4B, under Reference Numeral 450, Line 2, delete "stylsheet" and insert -- stylesheet --, therefor.

In the Specification

In Column 1, Line 17, delete "by" and insert -- be --, therefor.

In Column 5, Line 26, delete "other/style" and insert -- other style --, therefor.

In Column 6, Line 6, delete "provided" and insert -- provide an --, therefor.

In Column 6, Line 29, delete "loosely," and insert -- loosely; --, therefor.

In Column 11, Line 9, delete "in the in the" and insert -- in the --, therefor.

In Column 11, Line 27, delete "an/or" and insert -- and/or --, therefor.

In Column 12, Line 65, delete "and/pr" and insert -- and/or --, therefor.

In Column 14, Line 34, delete "ah" and insert -- an --, therefor.

In Column 14, Line 46, delete "an" and insert -- in --, therefor.

In Column 14, Line 67, delete "processor," and insert -- processor --, therefor.

In Column 15, Line 15, delete "700B" and insert -- 700b --, therefor.

Signed and Sealed this
Twenty-eighth Day of January, 2020

Andrei Iancu
*Director of the United States Patent and Trademark Office*

In the Claims

In Column 18, Line 42, in Claim 1, delete ")(Path" and insert -- XPath --, therefor.

In Column 19, Line 29, in Claim 10, delete "XML," and insert -- XML --, therefor.

In Column 19, Line 49, in Claim 10, delete "XML," and insert -- XML --, therefor.

In Column 21, Line 19, in Claim 19, delete "XML," and insert -- XML --, therefor.